(12) United States Patent
Hoffman et al.

(10) Patent No.: US 12,470,524 B2
(45) Date of Patent: Nov. 11, 2025

(54) MASKING PRIVATE INFORMATION WHILE STREAMING A LIVE SESSION

(71) Applicant: Content Square SAS, Paris (FR)

(72) Inventors: Doron Hoffman, Modiin (IL); Cynthia Goh, Paris (FR)

(73) Assignee: Content Square SAS, Paris (FR)

( * ) Notice: Subject to any disclaimer, the term of this patent is extended or adjusted under 35 U.S.C. 154(b) by 240 days.

(21) Appl. No.: 17/566,548

(22) Filed: Dec. 30, 2021

(65) Prior Publication Data

US 2023/0216835 A1    Jul. 6, 2023

(51) Int. Cl.
*H04L 9/40* (2022.01)
*G06V 30/41* (2022.01)
*H04L 51/04* (2022.01)

(52) U.S. Cl.
CPC .......... *H04L 63/0407* (2013.01); *G06V 30/41* (2022.01); *H04L 51/04* (2013.01)

(58) Field of Classification Search
None
See application file for complete search history.

(56) References Cited

U.S. PATENT DOCUMENTS

| | | | | |
|---|---|---|---|---|
| 2002/0184144 A1* | 12/2002 | Byrd | .................... | G06Q 20/102 |
| | | | | 705/40 |
| 2015/0074285 A1* | 3/2015 | Gahm | .................... | H04L 47/11 |
| | | | | 709/231 |
| 2015/0178371 A1* | 6/2015 | Seth | ..................... | G06F 40/117 |
| | | | | 707/755 |
| 2017/0054849 A1* | 2/2017 | Torre | .................. | G06Q 30/0271 |
| 2020/0012810 A1* | 1/2020 | Chavez | ............... | G06F 16/9535 |
| 2020/0014642 A1* | 1/2020 | Sidi | ...................... | H04M 3/5141 |

(Continued)

FOREIGN PATENT DOCUMENTS

| WO | WO-2010045109 A1 * | 4/2010 | ........... H04L 65/608 |
|---|---|---|---|
| WO | 2014055861 | 4/2014 | |

(Continued)

OTHER PUBLICATIONS

"International Application Serial No. PCT/IB2022/062920, International Search Report mailed Mar. 14, 2023", 4 pgs.

(Continued)

*Primary Examiner* — Lance Leonard Barry
(74) *Attorney, Agent, or Firm* — Schwegman Lundberg & Woessner, P.A.

(57) ABSTRACT

Aspects of the present disclosure involve a system comprising a computer-readable storage medium storing a program and method for streaming a live session. The program and method provide for receiving, from a first device of a first user, indication of first user input provided by the first user with respect to a first data input field of plural data input fields included in a displayed page; determining whether the first user input corresponds to personally identifiable information; causing, when the first user input does not correspond to personally identifiable information, a second device associated with a second user to display the plural data input fields and to display the first user input; and causing, when the first user input corresponds to personally identifiable information, the second device to display the plural data input fields and to mask display of the first user input.

17 Claims, 10 Drawing Sheets

(56) References Cited

U.S. PATENT DOCUMENTS

2021/0256158 A1* 8/2021 Abdi Taghi Abad ........................ H04L 9/3213
2023/0108156 A1* 4/2023 Kirkovski ............... H04L 67/02 709/227

FOREIGN PATENT DOCUMENTS

| WO | WO-2014055861 A1 * | 4/2014 | ........... G06F 16/951 |
|----|---------------------|--------|------------------------|
| WO | 2016073469 | 5/2016 | |

OTHER PUBLICATIONS

"International Application Serial No. PCT/IB2022/062920, Written Opinion mailed Mar. 14, 2023", 7 pgs.

* cited by examiner

MASKING PRIVATE INFORMATION WHILE STREAMING A LIVE SESSION

TECHNICAL FIELD

The present disclosure relates generally to web session analysis, including streaming a live session within an experience analytics system.

BACKGROUND

Web analysis solutions provide for the collection and analysis of website data. Such solutions may provide for the analysis of individual webpage visits.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Web analysis solutions provide for the collection and analysis of website data. Such solutions relate to post-visit analytics, and may fail to provide for the identification of webpage errors, user confusion and/or other issues an end user may experience during a user's site session. As such, these solutions may not address real-time site issues. Moreover, these solutions may fail to provide sufficient personally identifiable information (PII) protections.

The disclosed embodiments provide an experience analytics system configured to provide real-time analysis of ongoing web activity, and further configured to mask PII information entered by a user. When a website visitor at a customer client device encounters an issue (e.g., an error such a defective checkout button, and/or another type of issue) when using the website, the user may engage a live help support feature, allowing the user to connect with a help agent at a member client device. In response, the user's session data may be pushed to a short-latency queue (SLQ), for streaming live session data to the help agent.

The member client device is presented with a live session link which is user-selectable to initiate streaming of live session data from the customer client device. Following the help agent's selection of the live session link, the live replay data posted to the SLQ is collected by the experience analytics system, and combined with previous recorded data of session activity stored in a database. The experience analytics system generates a combined SLQ and database data feed, which is presented to the help agent at the member client device, thereby permitting the help agent to view the user's session and provide suggestions regarding how the user can better engage with the website. In addition, the live replay facilitates the help agent in understanding customer issues, and addressing such issues in a timely manner.

Moreover, any PII entered by the user during the session, such as names, addresses, credit card numbers, and the like, may be masked (e.g., obfuscated) during streaming of the live session. In this manner, storage of PI and transmission of PII to the member client device is prevented.

Networked Computing Environment

Figure 1:
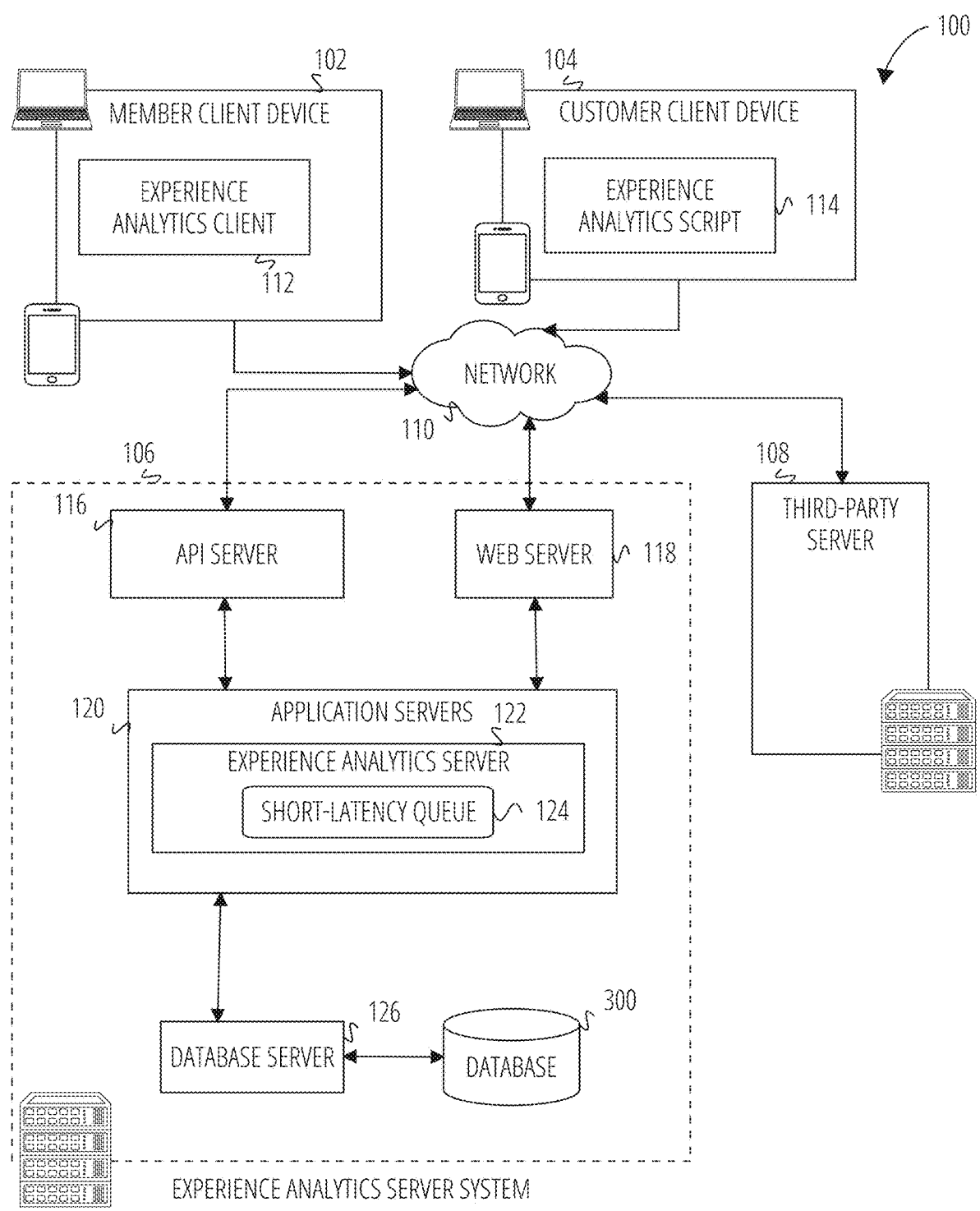
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 104, and multiple instances of a third-party server 108.

The member client device 102 is associated with a client of the experience analytics system 100, where the client that has a website hosted on the client's third-party server 108. An agent of the client (e.g., a web administrator, an employee, an operator, etc.) can be the user of the member client device 102.

Each of the member client devices 102 hosts a number of applications, including an experience analytics client 112. Each experience analytics client 112 is communicatively coupled with an experience analytics server system 106 and third-party servers 108 via a network 110 (e.g., the Internet). An experience analytics client 112 can also communicate with locally-hosted applications using Applications Program Interfaces (APIs).

The member client devices 102 and the customer client devices 104 can also host a number of applications including Internet browsing applications (e.g., Chrome, Safari, etc.). The experience analytics client 112 can also be implemented as a platform that is accessed by the member client device 102 via an Internet browsing application or implemented as an extension on the Internet browsing application.

Users of the customer client device 104 can access client's websites that are hosted on the third-party servers 108 via the network 110 using the Internet browsing applications. For example, the users of the customer client device 104 can navigate to a client's online retail website to purchase goods or services from the website.

The third-party server 108 may include data relating to websites, data relating to webpages, other, like, data, and any combination thereof. The third-party server 108 may be a local web source(s), remote web source(s), or any combination thereof, including a cloud-based network(s), distributed network(s), and the like. Examples of the third-party server 108 include, but are not limited to, repositories of webpage information, repositories of webpage element or zone information, servers configured to provide "live" webpages, other, like, sources, and any combination thereof.

While a user of the customer client device 104 is navigating a client's website on an Internet browsing application, the Internet browsing application on the customer client device 104 can also execute a client-side script (e.g., JavaScript (.*js)) such as an experience analytics script 114. In one example, the experience analytics script 114 is hosted on the third-party server 108 with the client's website and processed by the Internet browsing application on the customer client device 104. The experience analytics script 114 can incorporate a scripting language (e.g., a .*js file or a .json file).

In certain examples, a client's native application (e.g., ANDROID™ or IOS™ Application) is downloaded on the customer client device 104. In this example, the client's native application including the experience analytics script 114 is programmed in JavaScript leveraging a Software Development Kit (SDK) provided by the experience analytics server system 106. The SDK includes Application Programming Interfaces (APIs) with functions that can be called or invoked by the client's native application.

In one or more embodiments, the experience analytics script 114 is configured to collect activity relating to a client's interaction with the third-party server 108 content through a webpage displayed on the customer client device 104. In one example, the experience analytics script 114 records data including the changes in the interface of the webpage being displayed on the customer client device 104, the elements on the webpage being displayed or visible on the interface of the customer client device 104, the text inputs by the user into the webpage, a movement of a mouse (or touchpad or touch screen) cursor, user scrolls, and mouse (or touchpad or touch screen) clicks on the interface of the webpage. In addition, and with proper user permissions, the experience analytics script 114 may be configured to collect activity data features including, customer client device 104 type, website/application type, customer client device 104 geolocation, customer client device 104 internet protocol (IP) address, uniform resource locators (URLs) accessed by the customer client device 104, customer client device 104 screen resolution, and/or referrer URLs.

The experience analytics script 114 transmits the data to the experience analytics server system 106 via the network 110. In another example, the experience analytics script 114 transmits the data to the third-party server 108 and the data can be transmitted from the third-party server 108 to the experience analytics server system 106 via the network 110. As such, the experience analytics script 114 is configured to collect activity relating to a client's interaction with web server content (e.g., content from the third-party server 108) through a webpage displayed on the customer client device 104.

In one or more embodiments, the experience analytics script 114 may be included within the source code of a webpage, such as the hypertext markup language (HTML) code underlying such a webpage, where such source code is hosted by the third-party server 108 (e.g., web server). Where a user of the customer client device 104 connects to the third-party server 108 and requests to visit a given webpage, the underlying code for the webpage is downloaded to the customer client device 104 and rendered thereupon, including the experience analytics script 114, providing for user interaction with the webpage, as well as for data collection by the experience analytics script 114.

In one or more embodiments, the member client device 102 includes an experience analytics client 112. The experience analytics client 112 is a platform, program, service, or the like, configured to provide help agents, and the like, with the ability to view details of a live session. For example, the experience analytics client 112 is configured to provide user interfaces to display one or more features of a live session, including, without limitation, live session events, historical replay data, and the like, as well as any combination thereof, in addition to PII-masked variants thereof. The experience analytics client 112 may be configured to provide a help agent with a unique per-session view, the unique per-session view corresponding to a single user's current session. The experience analytics client 112 may be configured to provide the unique view upon the help agent's activation of a unique link (e.g., a live session link), where such a unique link may be sent to the member client device 102 upon a user's interaction with a "live support" or similar button or feature, as may be included in a webpage which a user is visiting on the customer client device 104.

The experience analytics client 112 may be further configured to identify, based on the contents of the unique link, one or more relevant live replay data features including, without limitation, live session events, historical recorded events, and the like, as well as PII-masked versions thereof, and to collect, receive, or otherwise access such data features. Specifically, the experience analytics client 112 may be configured to access live session events by opening a connection to a short-latency queue (SLQ) 124.

In addition, the experience analytics client 112 may be configured to collect or receive data relevant to one or more previous sessions including, as examples and without limitation, session replays, session replay analytics, and the like, as well as various combinations and PII-masked versions thereof. The experience analytics client 112 may be configured to provide for collection, receipt, or the like, of such data, as may be relevant to such previous sessions, from one or more sources including, without limitation, the database 300, and the like, as well as any combination thereof.

Following collection, receipt, or the like, of live and historical session data, the experience analytics client 112 provides for displaying user interface(s) with one or more of such data features to a help agent, providing for agent review of current and historical session data, including in PII-masked form. Such presentation, through the member client device 102, provides for short-term view of session data combined with long-term persistent view of session data. In this regard, data exchanged between the experience analytics client 112 and the experience analytics server system 106 may include functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 106 supports various services and operations that are provided to the experience analytics client 112. Such operations include transmitting data to and receiving data from the experience analytics client 112. Data exchanges to and from the experience analytics server system 106 are invoked and controlled through functions available via user interfaces (UIs) of the experience analytics client 112.

The experience analytics server system 106 provides server-side functionality via the network 110 to a particular experience analytics client 112. While certain functions of the experience analytics system 100 are described herein as being performed by either an experience analytics client 112 or by the experience analytics server system 106, the location of certain functionality either within the experience analytics client 112 or the experience analytics server system 106 may be a design choice. For example, it may be technically preferable to initially deploy certain technology and functionality within the experience analytics server system 106 but to later migrate this technology and functionality to the experience analytics client 112 where a member client device 102 has sufficient processing capacity.

Turning now specifically to the experience analytics server system 106, an Application Program Interface (API) server 116 is coupled to, and provides a programmatic interface to, application servers 120. The application servers 120 are communicatively coupled to a database server 126, which facilitates access to a database 300 that stores data associated with experience analytics processed by the application servers 120. Similarly, a web server 118 is coupled to the application servers 120, and provides web-based interfaces to the application servers 120. To this end, the web server 118 processes incoming network requests over the Hypertext Transfer Protocol (HTTP) and several other related protocols.

The Application Program Interface (API) server 116 receives and transmits message data (e.g., commands and message payloads) between the member client device 102 and the application servers 120. Specifically, the Application Program Interface (API) server 116 provides a set of interfaces (e.g., routines and protocols) that can be called or queried by the experience analytics client 112 or the experience analytics script 114 in order to invoke functionality of the application servers 120. The Application Program Interface (API) server 116 exposes to the experience analytics client 112 various functions supported by the application servers 120, including generating information on errors, insights, merchandising information, adaptability information, images, graphs providing visualizations of experience analytics, session replay videos, zoning and overlays to be applied on the website, etc.

The application servers 120 host a number of server applications and subsystems, including for example an experience analytics server 122. The experience analytics server 122 implements a number of data processing technologies and functions, particularly related to the aggregation and other processing of data including the changes in the interface of the website being displayed on the customer client device 104, the elements on the website being displayed or visible on the interface of the customer client device 104, the text inputs by the user into the website, a movement of a mouse (or touchpad) cursor and mouse (or touchpad) clicks on the interface of the website, etc. received from multiple instances of the experience analytics script 114 on customer client devices 104. The experience analytics server 122 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 122, in view of the hardware requirements for such processing.

In one or more embodiments, the experience analytics server 122 is configured to execute instructions for streaming live sessions (e.g., live browsing sessions). As is relevant to the execution of instructions for streaming live sessions, live sessions are real-time or near-real-time representations of user journeys through a webpage or set of webpages, including the users' interactions therewith. It should be noted that in the information provided by all the personally-identifiable information (PII) is already masked. This masking of private information may include masking, obfuscating, deleting, or otherwise eliminating one or more personally-identifiable information (PII) data features from one or more session representations, including, without limitation, stored replays, live replays, and the like, as well as any combination thereof.

The experience analytics server 122 may be configured to activate a "live mode" or other, similar, program, routine, or the like, in response to the receipt, collection, or the like, of one or more "live mode" trigger commands, instructions, or the like, as may be sent by the experience analytics script 114, as described above. Such "live mode" routines may include, without limitation, increasing session event processing frequency, initiating one or more post-to-SLQ processes, such as may be applicable to the population of the short-latency queue (SLQ) 118 with live replay events and data, and the like.

The SLQ 124 may provide for collection, receipt, or the like, of session events, including session events in the order of collection or receipt, PII-masked session events, and any combination thereof. The SLQ 124 is a memory, storage, or other, like, component, configured to provide real-time or near-real-time storage of session events, such as clicks, scrolls, text entries, and the like, in the order in which such session events are generated during a user's session, as well as subsequent retrieval or transmission of such stored events, including in order, in real-time or near-real-time, as described hereinbelow. The SLQ 124 may be configured as a virtual component, as a physical component, or in a hybrid physical-virtual configuration.

In one or more embodiments, the database 300 is configured to archive data permanently or semi-permanently. The database 300 may be configured to store information received from one or more web third-party servers 108 (e.g., based on a request from the experience analytics server 122 to the third-party servers 108 for information, such as webpage content), customer client devices 104, and other, like, components, as well as to store data relevant to the operation of the experience analytics server 122 and any outputs therefrom. The database 300 may be a local system, a remote system, or a hybrid remote-local system. Further, the database 300 may be configured as a fully-physical system, including exclusively physical components, as a virtualized system, including virtualized components, or as a hybrid physical-virtual system. Examples of devices which may be configured as a database 300 in the experience analytics system 100 include, without limitation, local database hardware, cloud storage systems, remote storage servers, other, like, devices, and any combination thereof. Further, the database 300 may be directly connected to the experience analytics server 122, such as without an intermediate connection to the network 110, including via connections similar or identical to those described with respect to the network 110.

In one or more embodiments, the database 300 may be configured to store or otherwise archive data relating to one or more sessions, including, without limitation, user interactions, user sessions, other, like, data, and any combination thereof. Further, the database 300 may be configured to transfer, to and from the experience analytics server 122, data necessary for the execution of the methods described herein, and may store or otherwise archive experience analytics server 122 inputs, experience analytics server 122 outputs, or both.

As an example of a potential use-case involving the experience analytics system 100, as may be relevant to the descriptions provided herein, a user may attempt to access a website to purchase a product. The user may, through the customer client device 104, and a browser app included therein, generate a request to access the website. The request, when received by the third-party server 108, may configure the third-party server 108 to send a copy of webpage(s) of the website to the customer client device 104, including the experience analytics script 114. The database 300 may store a copy of the webpage(s) from the third-party servers 108 (e.g., based on a request from the experience analytics server 122 to the third-party servers 108). The experience analytics server 122 may provide such copy to the customer client device 104. During the course of the customer client's session, the experience analytics script 114 may collect session data and transmit such data to the experience analytics server 122 for storage in the database 300.

In addition, where the user at the customer client device 104 encounters an issue (e.g., an error such a defective checkout button, user confusion, and/or another type of issue), the user may engage a live help support feature (e.g., implemented by the experience analytics server 122), for example, by selecting a chat button. In this regard, the help support feature includes a chat component, which allows a support agent at the member client device 102 to chat with the user at the customer client device 104. Moreover, the help support feature allows the user to connect with the help agent, causing the experience analytics script 114 to employ a script interface (e.g., a Javascript API) to make data available for the member client device 102 (e.g., such that when the live session link/button is pressed, this data is visible to the agent), and to send a live mode trigger to the experience analytics server system 106. Following receipt of the live mode trigger by the experience analytics server system 106, the user's session data may be pushed to the SLQ 124 of the experience analytics server 122, in real-time or near-real-time. The experience analytics server 122 sends the live session link to the member client device 102, where the live session link is selectable by the help agent.

Following a help agent's activation of the live session link, the experience analytics server 122 may be configured to provide live session replay to the member client device 102. For example, the experience analytics server 122 generates a combined SLQ 124 and database 300 data feed, and provides the combined data feed to the help agent at the member client device 102, in real-time or near-real-time, permitting the help agent to view the user's live session, and provide suggestions regarding how the user can better engage with the website. The merging allows the help agent to seek back (e.g., rewind) to view what happened, even before the website visitor at the customer client device 104 pressed the chat button.

Moreover, any PII entered by the user during the session, such as names, addresses, credit card numbers, and the like, may be masked during session recording, preventing storage of such PII or viewing of such PII through the replay terminal.

System Architecture

Figure 2:
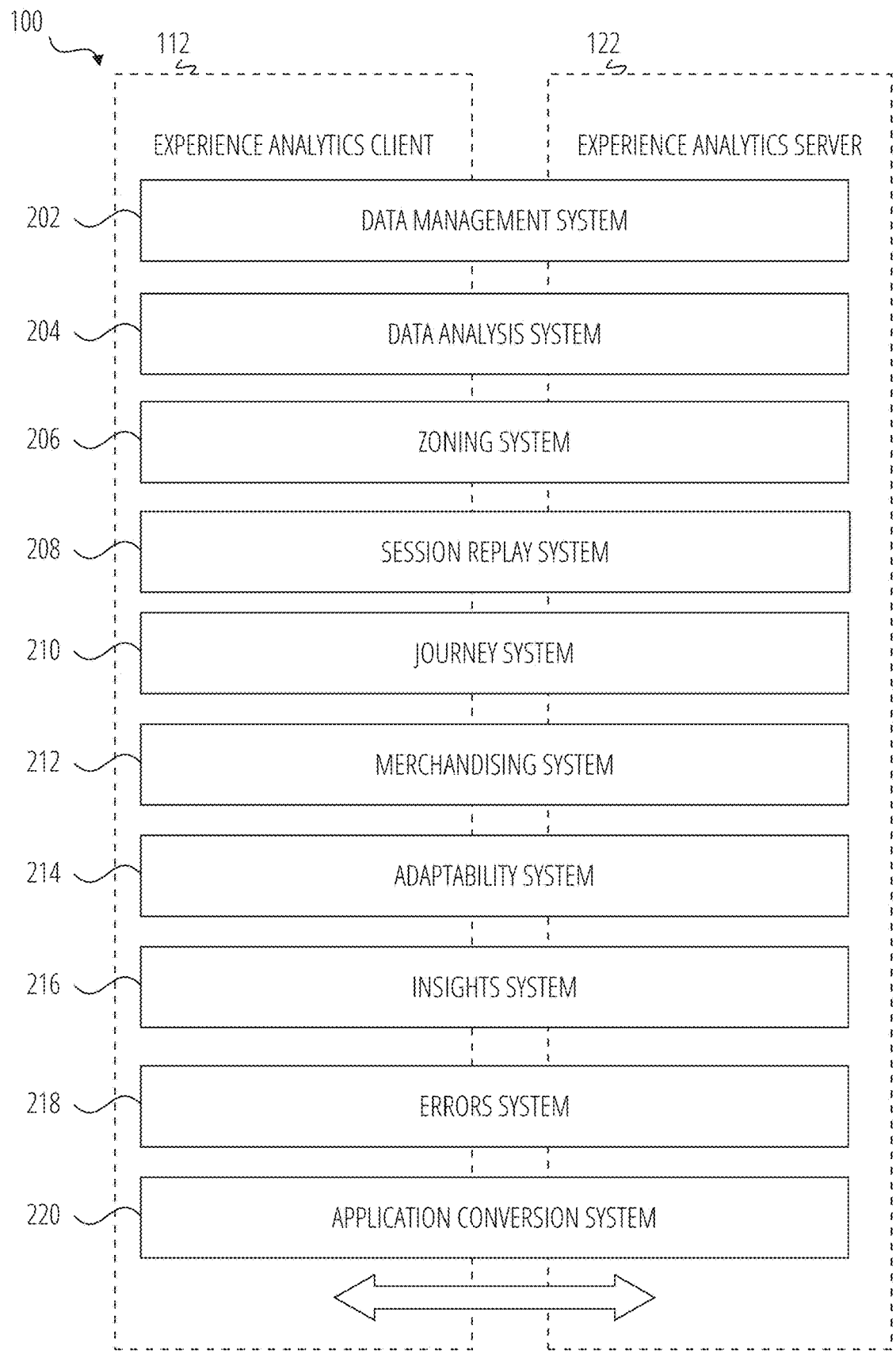
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 112 and the experience analytics server 122. The experience analytics system 100 embodies a number of subsystems, which are supported on the client-side by the experience analytics client 112 and on the server-side by the experience analytics server 122. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 114 executed by each of the customer client devices 104, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 112. The zoning interface provides a visualization of how the users via the customer client devices 104 interact with each element on the client's website. The zoning interface can also provide an aggregated view of in-page behaviors by the users via the customer client device 104 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 112. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 104 can be reconstructed from the data received from the user's experience analytics script 114 on customer client devices 104. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 112. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 104) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 112. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 104 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 114 to determine whether an accessibility-enhanced version of the client's website is needed, and can generate the accessibility-enhanced version of the client's website to be displayed by the customer client device 104.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 112 on a dashboard of a user interface, as a pop-up element, as a separate panel, etc. In this example, the insights system 216 is responsible for generating an insights interface to be displayed by the member client device 102 via the experience analytics client 112. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 104 visiting the client's website). The errors can also include causes of looping behaviors by the users, in-page issues such as unresponsive calls to action and slow loading pages, etc. The errors can be displayed by the member client devices 102 via the experience analytics client 112 on a dashboard of a user interface, as a pop-up element, as a separate panel, etc. In this example, the errors system 218 is responsible for generating an errors interface to be displayed by the member client device 102 via the experience analytics client 112. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 122 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 112. The application conversion system 220 generates an accessibility-enhanced version of the client's mobile application to be displayed by the customer client devices 104.

Data Architecture

Figure 3:
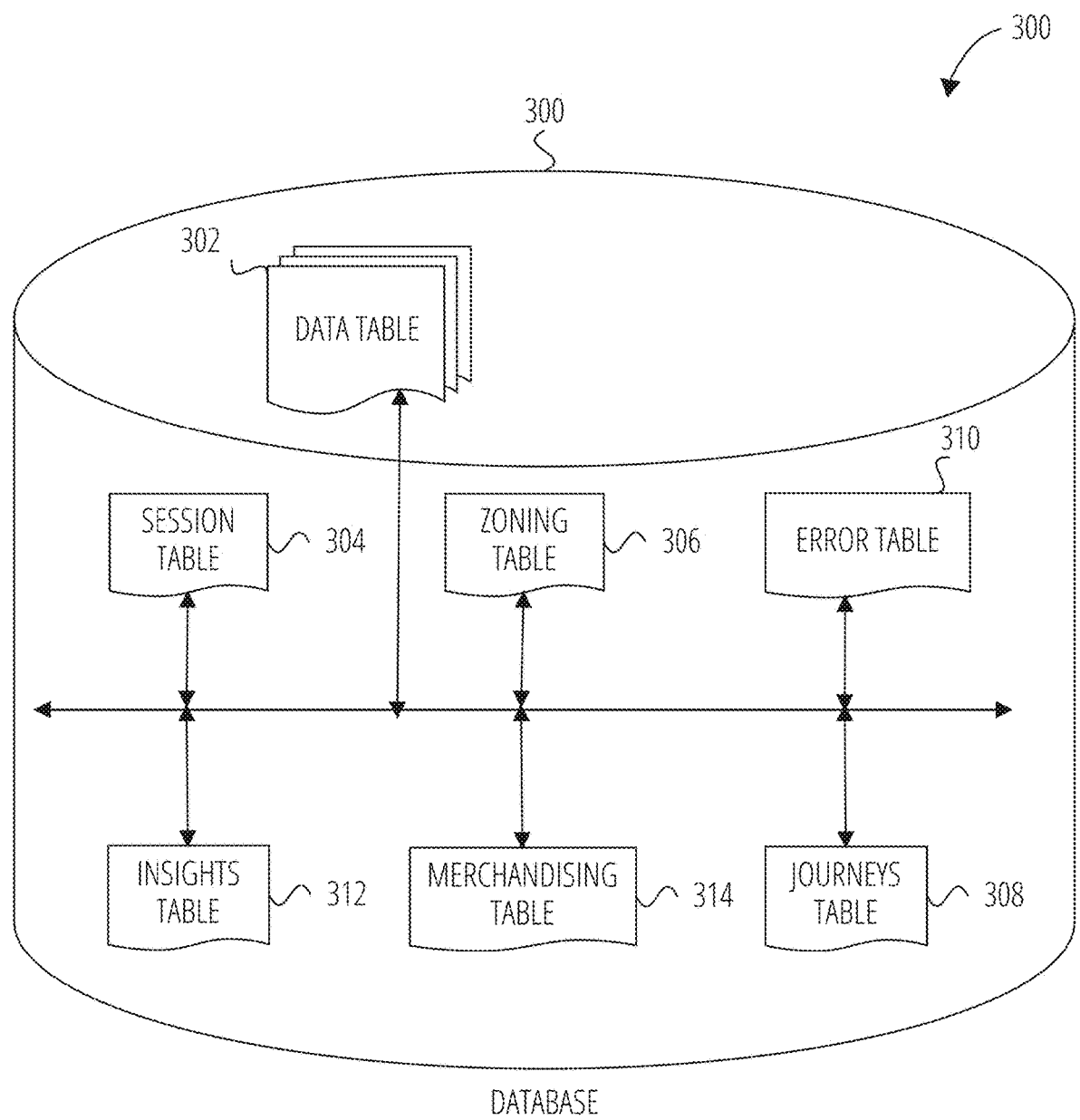
FIG. 3 is a diagrammatic representation of a data structure as maintained in a database, in accordance with some examples.

FIG. 3 is a schematic diagram illustrating database 300, which may be stored in the database 300 of the experience analytics server 122, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 104, the elements on the website being displayed or visible on the interface of the customer client device 104, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications. Session replays may include session events associated with browsing sessions. In one or more embodiments, session events correspond to user interactions with one or more elements, sections, zones (e.g., stored in association with the zoning table 306 discussed below), or the like, of a webpage. Examples of session events include, but are not limited to, user input of entering text in a text box, clicking a button with a mouse, tapping a button with a touchscreen, navigating to a webpage, navigating away from a webpage, scrolling up or down on the webpage, hovering over a webpage element, and the like, as well as any combination thereof. Session replay and recording may be executed by generating one or more logs, lists, and the like, of such events (e.g., as detected by an experience analytics script 114) included in a webpage accessed by a user of the customer client device 104. Such logs, lists, and the like may be stored in the session table 304, and may include one or more event descriptors including the event type, the event target, such as a specific button or text box, the event time, and the like, as well as combinations thereof.

The zoning table 306 stores data related to the zoning for each of the client's websites and native applications including the zones to be created and the zoning overlay associated with the websites and native applications. The journeys table 308 stores data related to the journey of each visitor to the client's website or through the native application. The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Figure 4:
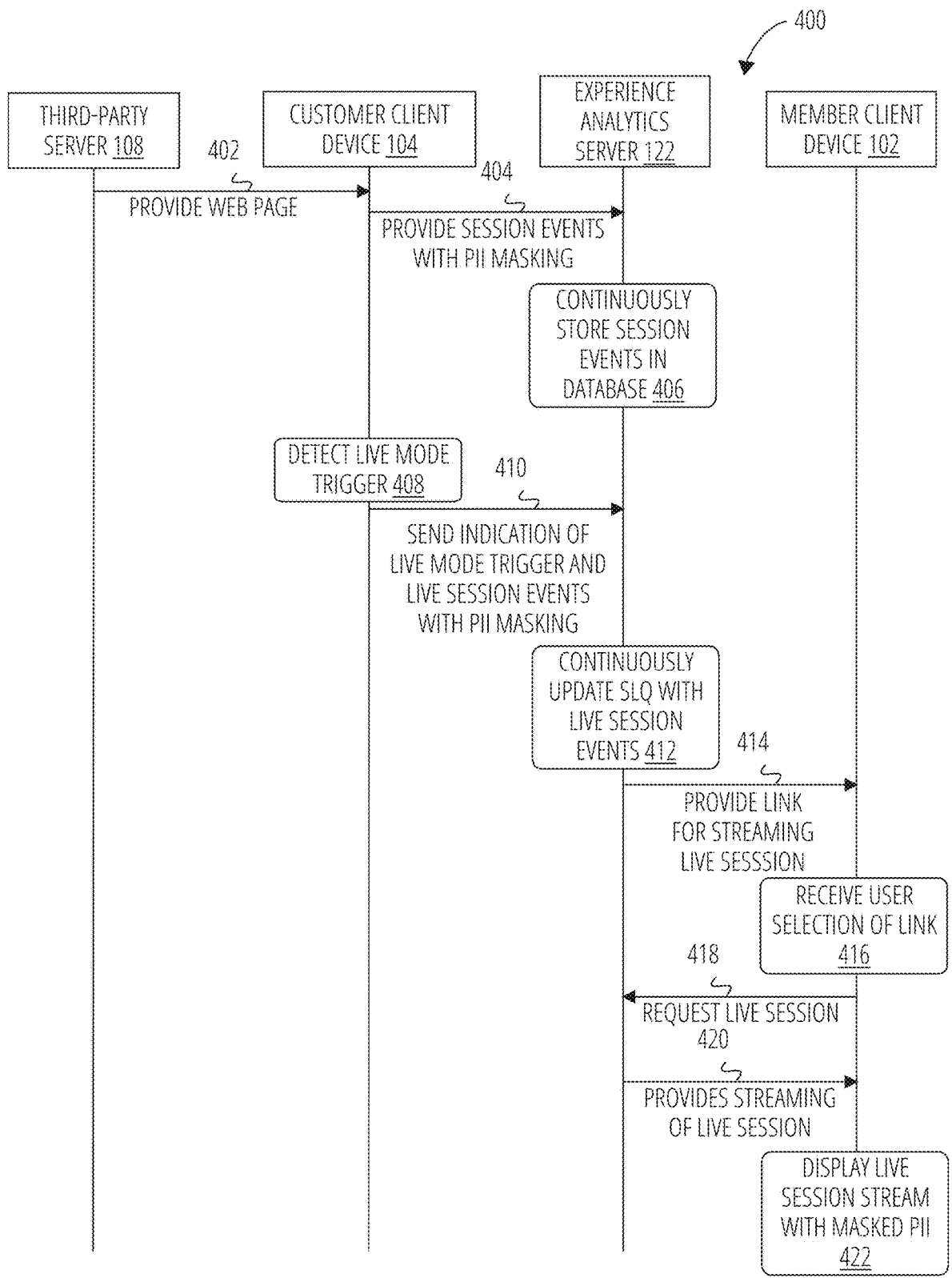
FIG. 4 is an interaction diagram illustrating a process for masking private information while streaming a live session, in accordance with some examples.

FIG. 4 is an interaction diagram illustrating a process 400 for masking private information while streaming a live session, in accordance with some examples. For explanatory purposes, the process 400 is primarily described herein with reference to the member client device 102, the customer client device 104, the third-party server 108 and the experience analytics server 122 of FIG. 1. However, one or more blocks (or operations) of the process 400 may be performed by one or more other components, and/or by other suitable devices. Further for explanatory purposes, the blocks (or operations) of the process 400 are described herein as occurring in serial, or linearly. However, multiple blocks (or operations) of the process 400 may occur in parallel or concurrently. In addition, the blocks (or operations) of the process 400 need not be performed in the order shown and/or one or more blocks (or operations) of the process 400 need not be performed and/or can be replaced by other operations. The process 400 may be terminated when its operations are completed. In addition, the process 400 may correspond to a method, a procedure, an algorithm, etc.

At operation 402, the third-party server 108 provides a web page to the customer client device 104. As noted above, a user of the customer client device 104 can access a website (e.g., a client of the experience analytics system 100) that is hosted on the third-party server 108 via the network 110 using an Internet browsing application.

The customer client device 104 provides session events with PII masking (operation 404), and the experience analytics server 122 continuously stores session events in the database 300 (block 406). In this regard, a session recording is initiated and collected by the experience analytics script 114 of the customer client device 104. The session recording includes the collection of the session events.

In one or more embodiments, session events are user interactions with one or more elements, sections, zones (e.g., as defined by the zoning system 206), or the like, of a webpage. Session events may include user input of entering text in a text box, clicking a button with a mouse, tapping a button with a touchscreen, navigating to a webpage, navigating away from a webpage, scrolling up or down on the webpage, hovering over a webpage element, and the like, as well as any combination thereof. Session recording may be executed by generating one or more logs, lists, and the like, of such events, as detected by an experience analytics script 114 included in a webpage accessed by a user (e.g., customer client) of the customer client device 104. Such logs, lists, and the like, may include one or more event descriptors including the event type, the event target, such as a specific button or text box, the event time, and the like, as well as combinations thereof.

In one or more embodiments, storage of session recordings may include storage of events in one or more formats including, as examples and without limitation, sets of session events, single-feature session replays, such as session-length recordings, other, like, formats, and any combination thereof. Further, storage of session recordings may include the storage of one or more associated data features, including, as examples and without limitation, analytic data, metadata, and the like, as well as any combination thereof.

The session recording may include the application of one or more personally identifiable information (PII) masking processes. In one or more embodiments, PII masking processes may be session recording subprocesses, configured to mask, obfuscate, or otherwise eliminate PII in the session recording. Moreover, PII masking during session recording includes detection of one or more masking triggers, followed by masking of PII associated with such triggers. PII triggers include, but are not limited to: text input matching one or more pre-defined or user defined text classifications; website hypertext markup language (HTML) or document object model (DOM) elements having one or more pre-defined or user-defined tags; and/or website HTML or DOM elements unrelated to webpage layout, website HTML or DOM elements, or the contents thereof, which are marked with one or more pre-defined or user-defined attributes. PII triggers may be detected during session recording by detection of one or more HTML, DOM, or other, like attributes, such as those described, which match one or more pre-defined or user-defined triggers, where such definitions may be included in the instructions relevant to the execution of session recording as described herein.

Where PII masking triggers include text classifications, such triggers may include user-entered text matching the formats of one or more PII types. Such PII types include, but are not limited to: phone numbers, email addresses, credit card numbers, social security numbers, and the like. In addition, where PII triggers include HTML or DOM elements having various pre-defined or user-defined tags or attributes, such tags or attributes may include, but are not limited to: tags or attributes describing a specific webpage element as being a "credit card number" text entry field, the contents of which should be masked as PII; tags or attributes providing for user-definition of a webpage element as including PII; and/or tags or attributes specifying a given webpage section or group of sections as including PII.

Further, where PII masking triggers include HTML or DOM elements unrelated to webpage layout, such triggers may include HTML or DOM elements not matching one or more pre-defined or user-defined webpage layout elements. In one or more embodiments, PII masking may be performed on a selective basis. For example, selective PII masking may apply to one or more webpages, or sections thereof, without applying PII masking to non-selected webpages or sections.

The customer client device 104 detects a live mode trigger (block 408). It is understood that block 408 may occur shortly after operations 402-406, such as within a matter of seconds (e.g., corresponding to a short browsing session before the live mode trigger is detected). Alternatively, block 408 may occur a longer period of time after operations 402-406, such as after several minutes or hours (e.g., corresponding to a longer browsing session before the live mode trigger is detected).

In one or more embodiments, a live mode trigger is an event, status, or the like, which satisfies one or more pre-defined or user-defined trigger conditions. Trigger replay conditions may be variously-configured to provide for the detection of a live replay trigger based on one or more events or statuses including, but not limited to: a user's activation of a specific zone or webpage element (e.g., a live help chat button), and/or a user's failure to navigate to a specific webpage (e.g., a checkout page) within a specific pre-defined time. A live replay trigger may be detected during the course of a web session, such as a user's navigation through a website, as well as at the beginning, end, or both, of such a session.

For example, a live mode trigger condition on a shopping page may be the user's activation of a "live help chat" button, which a user may click with a mouse to engage the help of a live support agent (e.g., an agent at the member client device 102). The user's session includes multiple events which are not related to the activation of the "live help chat" button. Such events may be recorded, as described above with respect to block 406, but the live replay trigger may not be detected until the user activates the "live help chat" button. Accordingly, when the user activates such button, the live replay trigger may be detected at block 408. In one or more embodiments, the experience analytics script 114 updates the link to the chat API so when the user presses the "live help chat" button, the link information would be available to the member client device 102. The customer client device 104 then sends an indication of the live mode trigger and live session events with PII masking to the experience analytics server 122 (operation 410).

At block 412, the experience analytics server 122 continuously updates the short-latency queue (SLQ) 124 with the live session events (block 412). In one more embodiments, live session data includes one or more data features collected during session recording (e.g., per block 406) including, without limitation, button presses, text entries, and the like, as well as any combination thereof. Live session data may be posted to the SLQ 124 as such data is recorded, such as upon the activation of a button or the entry of a keystroke, providing for real-time or near-real-time population of the SLQ 124 with session events, including population in the order in which such events are recorded. Further, it may be understood that session recording (e.g., per block 406) may persist throughout the execution of the process 400, including during the execution of block 412.

Live session data, as is posted to the SLQ 124 at block 412, may include one or more masked PII data features, including, without limitation, data features masked according to the masking subprocess described above operation 404. As an example, updating the SLQ 124 at block 412 includes the posting of a series of events, the series of events including a button click, a mouse scroll, the entry of PII text, and the entry of non-PII text to the SLQ 124. Further, posting such a series of events may include posting a PII-masked version of the series, the PII-masked version including a button click, a mouse scroll, the entry of a masked text data feature, and the entry of non-PII text.

As noted above, it is possible for the experience analytics script 114 to update the link to the chat API so when the user presses the "live help chat" button at the customer client device 104, the link information is made available to the member client device 102. Alternatively or in addition, and in conjunction with updating the SLQ 124, the experience analytics server 122, may provide a live session link for streaming the live session to the member client device 102 (operation 414), where the live session link is received by the experience analytics client 112 running on the member client device 102. While block 412 is illustrated as occurring before operation 414, the live session link may be provided to the member client device 102 in response to receiving the indication of the live mode trigger per operation 410. For example, the live session link may be provided to the member client device 102 operator upon detection of the site visitor's interaction with a live help element (e.g., the live help chat button).

The live session link is presented on the member client device 102 (e.g., the experience analytics client 112) and is user-selectable by the operator to establish a live session between the customer client device 104 and the member client device 102 operator. In one or more embodiments, the live session link is presented to the operator together with information specifying a given session, a given webpage, and the like.

In the example of FIG. 4, the member client device 102 receives user selection of the live session link for streaming the live session (block 416). In response, the member client device 102 sends a request for streaming the live session to the experience analytics server 122 (operation 418).

In response to user selection of the live session link, the experience analytics server 122 provides for streaming the live session to the member client device 102 (operation 420). In other words, the session, as its appears on the customer client device 104, is reconstructed and replayed using the session data from the SLQ 124 and/or the database 300. In one or more embodiments, the session can be reconstructed using history data (e.g., stored in the database 300). The reconstructed session would display the webpage, as currently viewed by on the customer client device 104, without any PII information. The session is reconstructed using data features included in the session data. Such data features may be DOM elements and DOM elements changes. Thus, the reconstructed session may be generated by rendering such elements.

According to example embodiments, no live video steam is sent from the customer client device 104 to the member client device 102. As such, no PII is stored and/or provided as output out from the customer client device 104 to another component (e.g., the database 300, the SLQ 124 and/or the member client device 102). Moreover, the reconstructed session from captured events requires less bandwidth as captured events and DOM elements (e.g., mouse clicks) are transmitted from the customer client device 104 to the member client device 102, and not live stream video. This provides a technical improvement over existing solutions, where for example, such session is established over a live video session.

To reconstruct the session, the experience analytics server 122 collects a session replay stream from the SLQ 124 of the experience analytics server 122 and/or recorded session data from the database 300. Collection of a session replay stream may include the collection of one or more streams specified, indicated, or the like, in a live session link.

Regarding the SLQ 124, collection of a session replay stream may include collection of one or more session events from the SLQ 124, such as the session events posted to the SLQ 124 as described above with respect block 412. Session events collected from the SLQ 124 may include, but are not limited to, button presses, text entries, and the like, and combinations thereof.

Further, collection of the session replay stream from the SLQ 124 may include the collection of one or more session events from the SLQ 124 in the order in which such events are pushed to the SLQ 124. Such ordered collection of session events provides for real-time or near-real-time presentation with respect to replaying the session stream. Session replay stream events, as may be collected from the SLQ 124, includes PII-masked events, including but not limited to, a text entry session event including a masked text data feature, where the corresponding unmasked text data feature includes site visitor PII.

As an example of reconstructing the session based at least in part on SLQ 124, a live mode trigger may be detected per operation 410, providing for the initiation of SLQ 124 posting per block 412. One or more session event data features, as are pushed to the SLQ 124 block 412, may be collected from the SLQ 124, providing for low-to-no-latency presentation of SLQ 124 session replay stream data.

The reconstruction of the session may be further based on prior recorded data per block 406. The recorded data includes data relevant to one or more recorded sessions, including, as examples and without limitation, session replays, session replay analytics, and the like, as well as any combination thereof. Collection of recorded data may include the collection of one or more recorded data features specified, indicated, or the like, in a live session link, such as may be activated as described with block 416. Recorded data may be collected from one or more sources including, without limitation, the database 300.

Thus, the experience analytics server 122 generates one or more combined data feeds, which includes the combination of SLQ data with recorded data, and provides the one or more combined data feeds to the experience analytics client 112 running on the member client device 102. The combined data feeds may include SLQ data features, such as low-to-no-latency representations of session events, as well as recorded data features, such as recordings of events which occurred during previous sessions. The combined data feed may include a combination of real-time or near-real-time session events with historical, recorded session events, providing for, as examples and without limitation, manual comparison of current and historical session events.

Further, as both the SLQ data and the recorded data include PII-masked session information, the corresponding combined data feed also includes PII-masked information. As an example, SLQ data includes one or more PII-masked session events, and such SLQ data are combined with similarly-masked recorded data to yield a PII-masked combined data feed.

Based on the combined data feeds, the experience analytics client 112 running on the member client device 102 displays the streaming live session with masked PII (block 422). The combined data feed may be presented to the operator of the member client device 102, by transmission to the member client device 102. For example, the experience analytics client 112 is configured to render the combined data feed as a combined real-time presentation, the presentation further including historical data features from the indicated recordings.

Presentation of the combined data feed may include display of one or more visual, textual, or other, like representations of combined data feed data. As described above, the operator of the member client device 102 may be a help agent attempting to assist a site visitor at the customer client device 104 with an issue (e.g., web error caused by a defective website element, user confusion, and/or another type of user issue). The combined data feed may be displayed on the member client device 102 by transmitting the combined data feed to the member client device 102 in real-time or near-real-time, providing for live session analysis by the operator (e.g., help agent). As the combined data feed includes PII-masked data features (e.g., based on the PII-masked SLQ data and/or the PII-masked recorded data), the site visitor's PII as input on the customer client device 104 may be masked from the help agent, in both the live replay stream component of the combined feed, and in the historical recordings component of the combined feed.

Thus, as the combined data feed presented to the help agent includes the SLQ stream, and as the SLQ stream may be updated for each session event, the presentation of the combined data feed may provide for the display of current session events, allowing a help agent to view a site visitor's actions, and provide assistance in response thereto, while simultaneously preventing the help agent from viewing any of the site visitor's PII.

Figure 5:
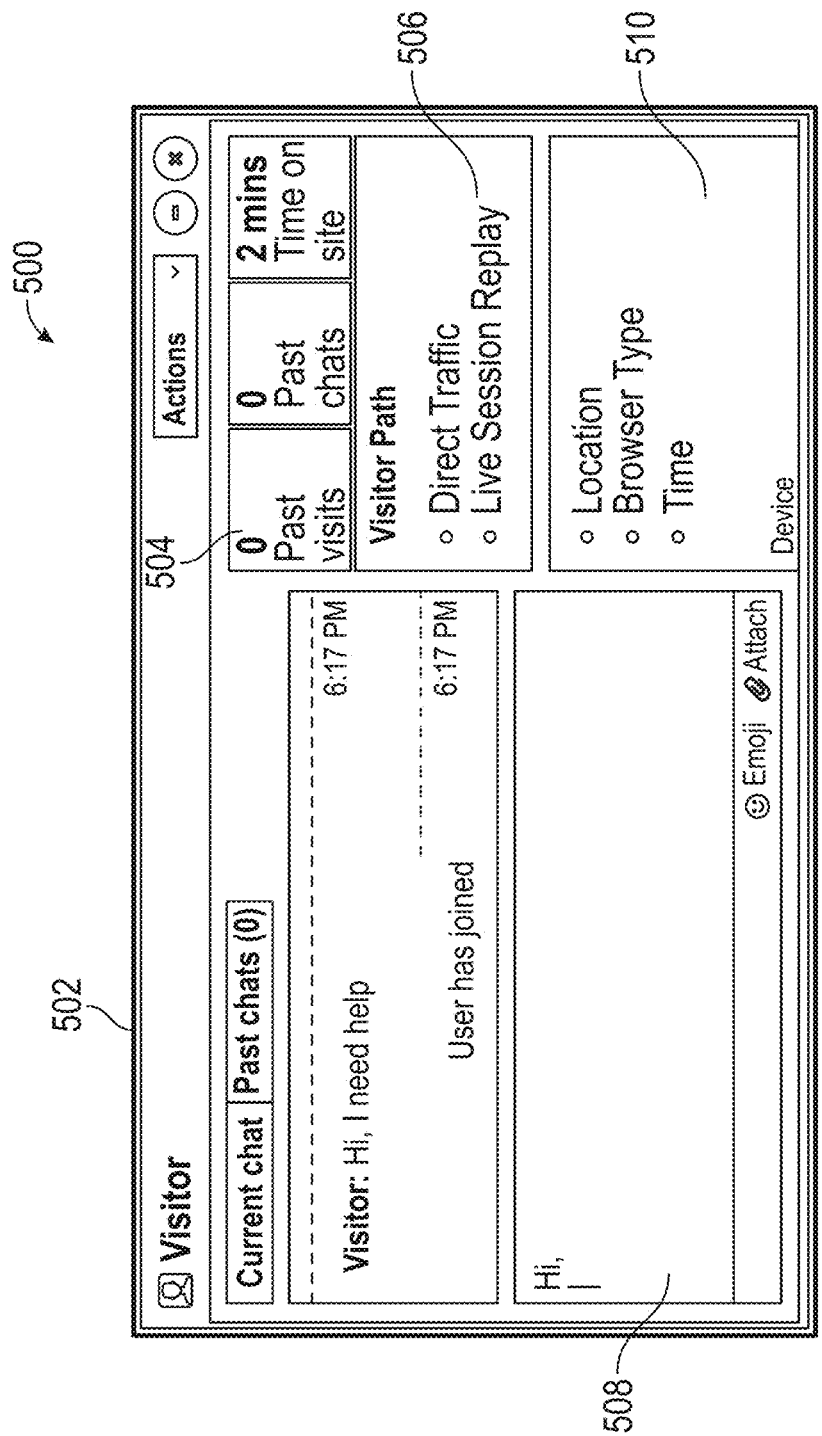
FIG. 5 illustrates an example user interface for establishing a live session at a member client device, in accordance with some examples.

FIG. 5 illustrates an example user interface 500 for establishing a live session at a member client device, in accordance with some examples. The user interface 500 includes a visitor identifier 502, a visitor statistics pane 504, a live session link 506, a chat pane 508 and a visitor data pane 510.

In one or more embodiments, the user interface 500 is presented on the member client device 102, for example, in response detection of a live mode trigger at the customer client device 104. For example, the user interface 500 is configured to provide a help session overview, to provide for management of a site visitor's help request by an operator (e.g., help agent), and to provide for streaming a live session.

In one or more embodiments, visitor identifier 502 is a descriptor providing information regarding the identity of a visitor such as, without limitation, a unique visitor identification (ID) number. The chat pane 508 is a two-way text communication element, providing for operator (e.g., help agent) communication with the site visitor. Via the chat pane 508, the site visitor (e.g., at customer client device 104) may describe the problem to the help agent (e.g., at the member client device 102), and the help agent may communicate with the visitor.

The visitor statistics pane 504 is an information element providing information regarding the site visitor's current and previous help sessions, including, without limitation, the number of times the visitor has visited the website in the past, the number of times the visitor has requested help from a live support agent, the length of the visitor's current session, and the like. As noted above, such information may be stored in the database 300, for persistence across multiple sessions. The visitor data pane 510 is an information element providing information regarding the visitor's access to the website, including, without limitation, the location from which the visitor is visiting the website, the browser, and browser version the visitor is using, the platform, or operating system, and version thereof, which the visitor is using, the device the visitor is using, and the like.

As noted above, the live session link 506 provides for operator (e.g., help agent) initiation to stream a live session. The live session link 506 is user-selectable to initiate streaming of a live session, as discussed above with respect to FIG. 4. The live session link 506 may be generated by the experience analytics script 114, providing for display of a live session interface or platform including data relevant to the site visitor's current and previous sessions.

Figure 6:
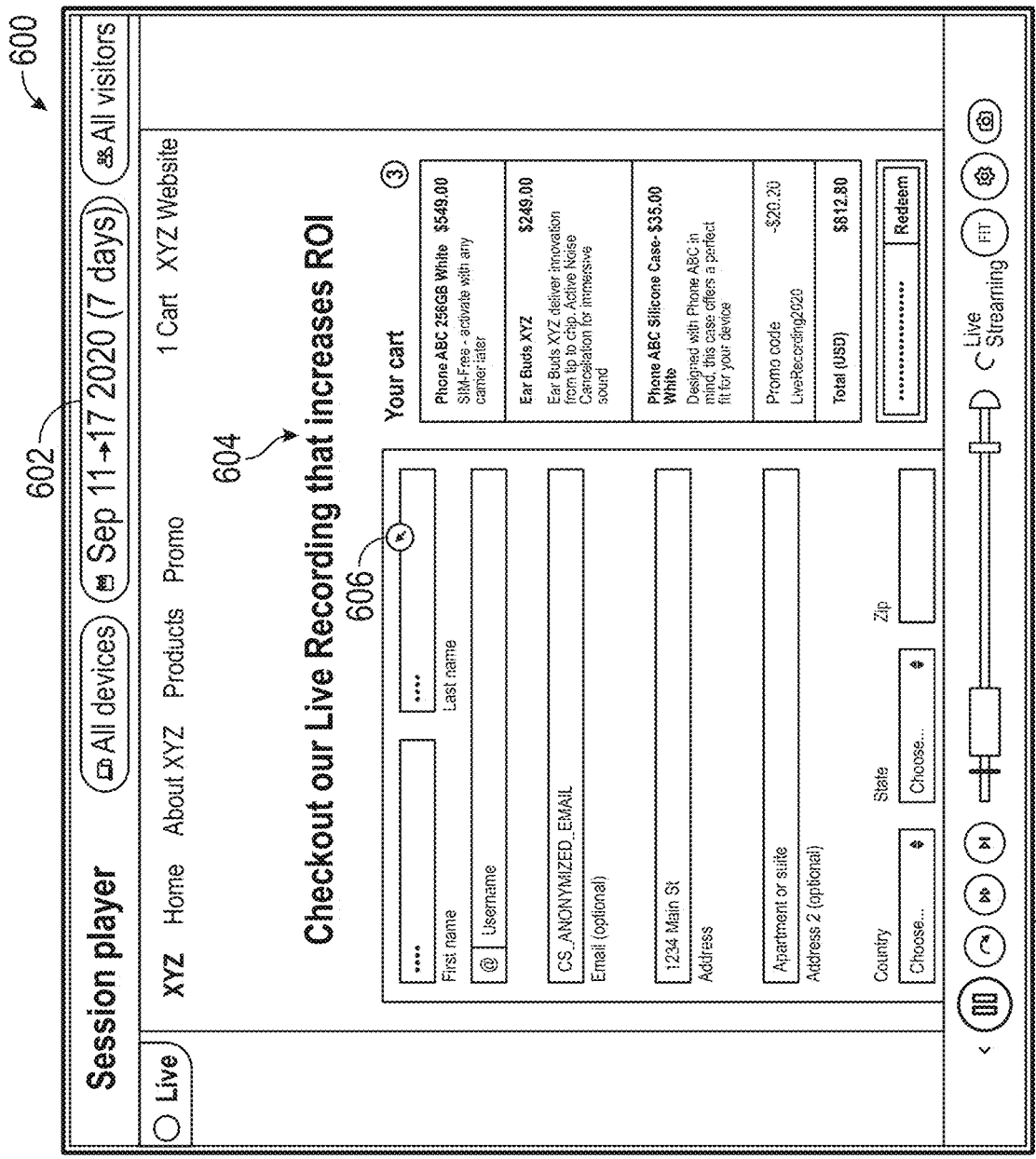
FIG. 6 illustrates an example user interface for masking private information while streaming a live session, in accordance with some examples.

FIG. 6 illustrates an example user interface 600 for masking private information while streaming a live session, in accordance with some examples. The user interface 600 includes a replay filter selector 602, a live session pane 604, a live cursor indicator 606 and a playback controls 608.

In one or more embodiments, the user interface 600 is configured to provide for live review, by an operator (e.g., help agent) of the member client device 102, of a site visitor's session, including PII-masking, as described above with respect to FIG. 4. For example, the user interface 600 is presented on the member client device 102 in response to selection, by the operator, of the live session link 506.

In one or more embodiments, the playback controls 608 are elements providing for help agent control of the streamed session playback. Playback controls may include, without limitation, pause, rewind, forward, play, time selection, settings, screenshot, and other, like, controls. For example, playback from a specific point in a live session (e.g., via forward, reverse and timeline interface elements of the playback controls 608) is effected by generating a combined data feed as described above with respect to FIG. 4, based on timestamps of recorded data in the database 300 and/or live session data from the SLQ 124.

The live session pane 604 is a display element configured to provide representations of PII-masked webpage events, as such events are received or collected by the experience analytics client 112 running on the member client device 102. The live session pane 604 includes a live cursor indicator 606, providing for help agent identification of the location of a site visitor's cursor as the site visitor navigates the webpage. The replay filter selector 602 is a replay selector, configured to provide for selection of one or more replays, or recorded sessions, based on one or more filter types, including, without limitation, source device, session date, visitor ID, and the like. As noted above, the replays may be generated from time-stamped session data stored in the database 300.

Figure 7:
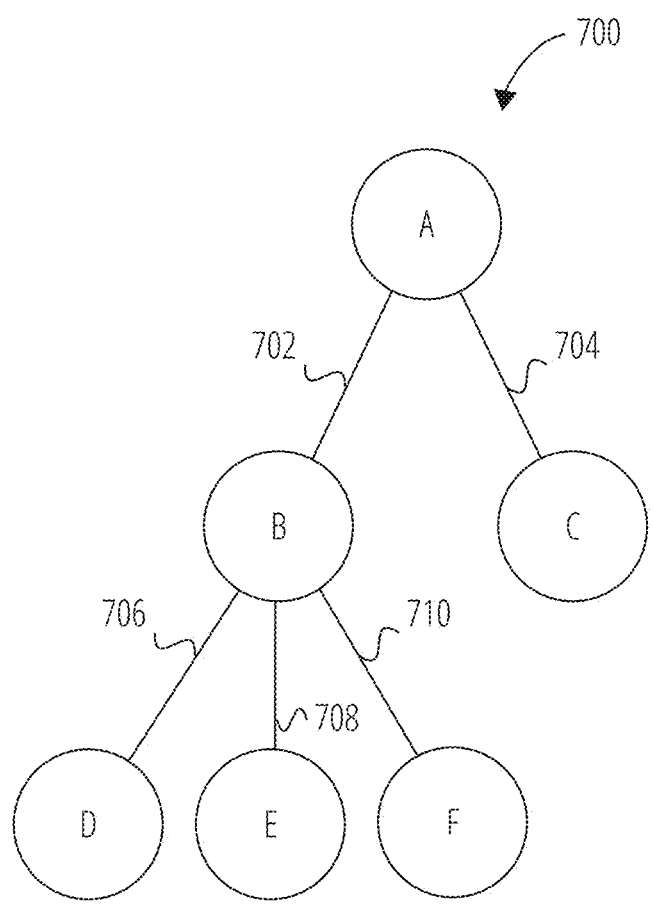
FIG. 7 illustrates an unlabeled document object model (DOM) tree, in accordance with some examples.

FIG. 7 illustrates an unlabeled document object model (DOM) tree 700, in accordance with some examples. In one or more embodiments, the unlabeled DOM tree 700 provides a visual representation of the hierarchical structure of a webpage's HTML code, with content zones or elements (e.g., as defined by the zoning system 206) represented as nodes A-F.

In the example unlabeled DOM tree 700, related nodes A-F are joined by links 702-710, representing the relationships between any two of the nodes A-F. In the example unlabeled DOM tree 700, a link 702 is established between nodes A and B, a link 704 is established between nodes A and C, a link 706 is established between nodes B and D, a link 708 is established between nodes B and E, and a link 710 is established between nodes B and F.

In addition, nodes B and C are disposed on a second tier below the first tier occupied by node A, reflecting a structure in which the content element or zone represented by node A includes the content elements or zones represented by nodes B and C. Moreover, nodes D, E and F are disposed on a third tier below the second tier occupied by node B, reflecting a structure in which the content element or zone represented by node B includes the content elements or zones represented by nodes D, E and F.

Figure 8:
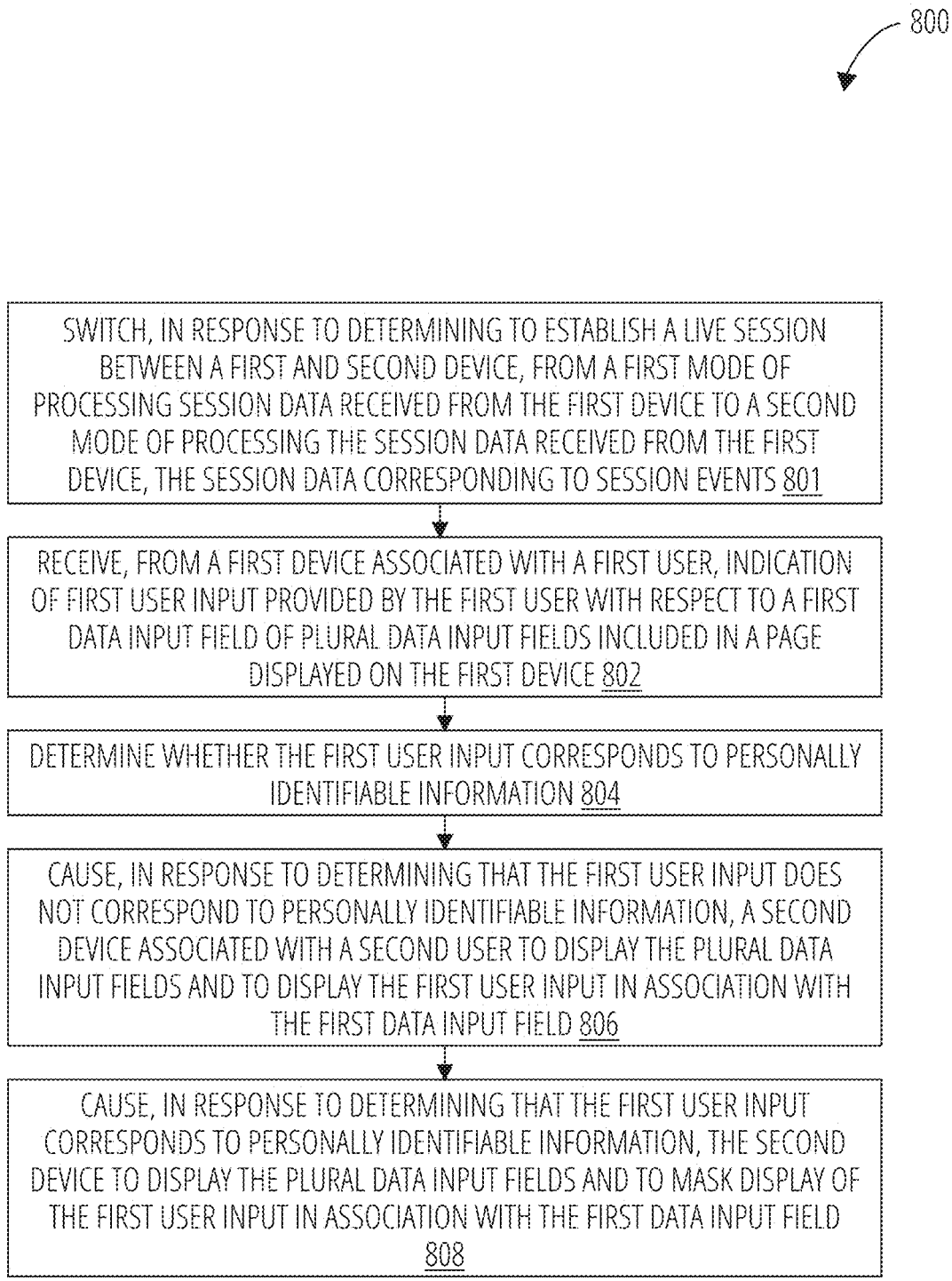
FIG. 8 is a flowchart illustrating a process for masking private information while streaming a live session, in accordance with some examples.

FIG. 8 is a flowchart illustrating a process 800 for masking private information while streaming a live session, in accordance with some examples. For explanatory purposes, the process 800 is primarily described herein with reference to the experience analytics server 122 of FIG. 1. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The experience analytics server 122 determines to establish a live session between a customer client device 104 associated with a first user and a member client device 102 associated with a second user, and switches, in response to the determining, from a first mode of processing session data received from the customer client device 104 to a second mode of processing the session data received from the customer client device 104, the session data corresponding to session events (block 801). The first mode provides for accessing a database in association with the session data for non-live replay of the session events, and the second mode provides for accessing both the database and a short-latency queue in association with the session data for live replay of the session events. The short-latency queue is configured to provide real-time or near-real-time storage of the session data, and to provide subsequent real-time or near-real-time retrieval of the session data and subsequent real-time or near-real-time transmission of the session data. The experience analytics server 122 receives, from the customer client device 104 associated with the first user (e.g., a website visitor), indication of first user input provided by the first user with respect to a first data input field of plural data input fields included in a page displayed on the customer client device 104 (block 802). The experience analytics server 122 determines whether the first user input corresponds to personally identifiable information (block 804).

Determining that the first user input corresponds to personally identifiable information may be based on one or more of: the first user input matching predefined text classifications indicating personally identifiable information, the first data input field being tagged to indicate personally identifiable information, and/or the first data input field being unrelated to a layout of the page.

The experience analytics server 122 causes, in response to determining that the first user input does not correspond to personally identifiable information, the member client device 102 associated with the second user (e.g., a help agent) to display the plural data input fields and to display the first user input in association with the first data input field (block 806).

Alternatively, the experience analytics server 122 causes, in response to determining that the first user input corresponds to personally identifiable information, the member client device 102 to display the plural data input fields and to mask (e.g., obfuscate) display of the first user input in association with the first data input field (block 808).

Causing the member client device 102 to display the plural data input fields, to display the first user input in association with the first data input field when the first user input does not correspond to personally identifiable information, and to mask display of the first user input in association with the first data input field when the first user input corresponds to personally identifiable information may correspond to providing a live session between the first user and the second user.

The experience analytics server 122 may receive, from the customer client device 104, indication of a live mode trigger indicating to establish the live session between the customer client device 104 and the member client device 102. The live session may be established based on receiving indication of the live mode trigger.

Receiving indication of the live mode trigger may be based on the first user initiating a chat session with the second user. Alternatively or in addition, receiving indication of the live mode trigger may be based on a predefined time period lapsing without the first user navigating to a specific webpage.

The experience analytics server 122 may receive, from the member client device 102, indication of user input selecting a link to establish the live session. The live session may be established based on receiving indication of the live mode trigger and indication of the user input.

Providing the live session may include receiving session data from the customer client device 104, updating the SLQ 124 with the session data, and causing, based on updating the SLQ 124, the member client device 102 device to display the live session.

The experience analytics server 122 may store, in the database 300 and based on determining that the first user input does not correspond to personally identifiable information, the first user input in association with the first data input field. The experience analytics server 122 may store, in the database 300 and based on determining that the first user input corresponds to personally identifiable information, a masked version of the first user input in association with the first data input field.

Machine Architecture

Figure 9:
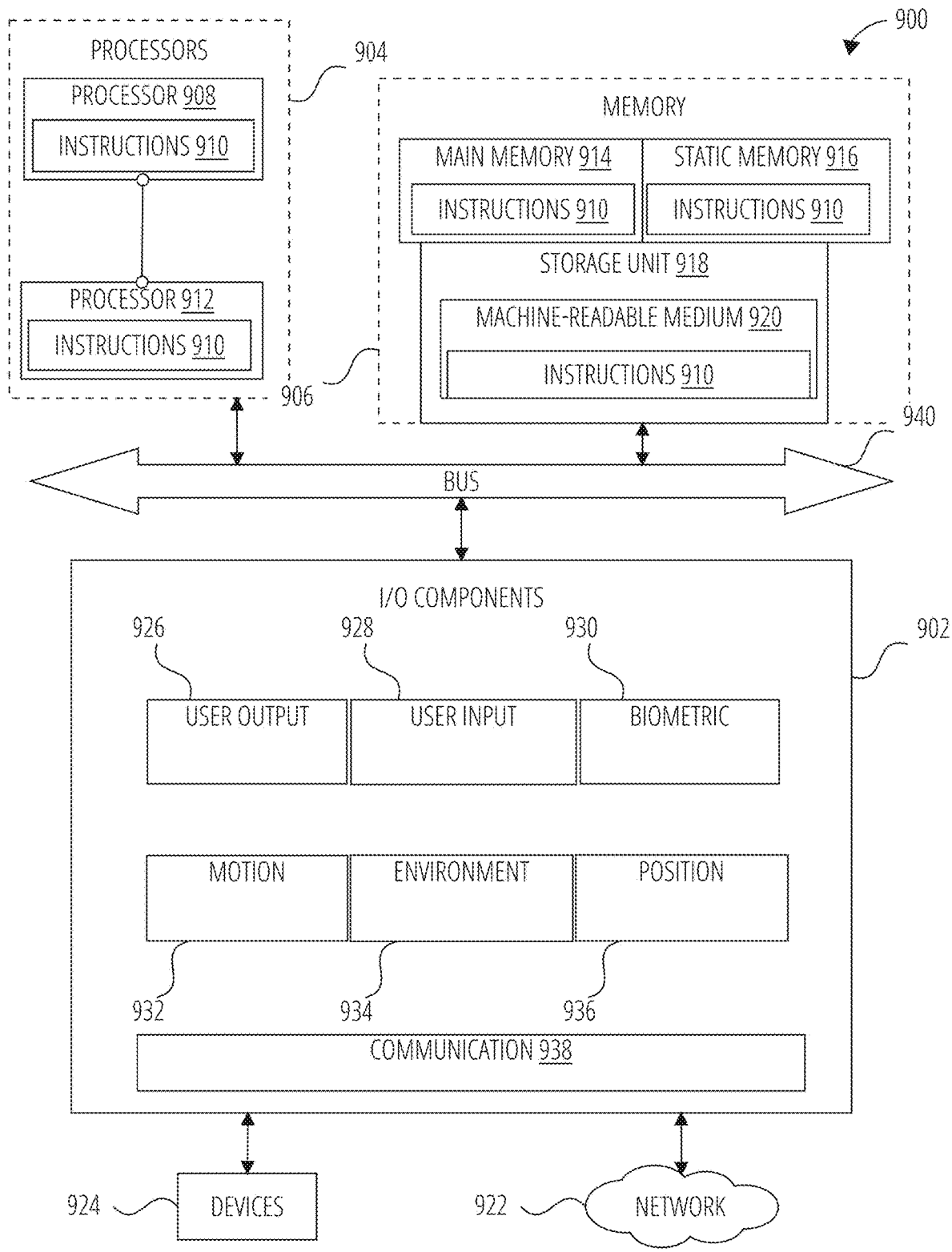
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an application, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the member client device 102 or any one of a number of server devices forming part of the experience analytics server 122. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
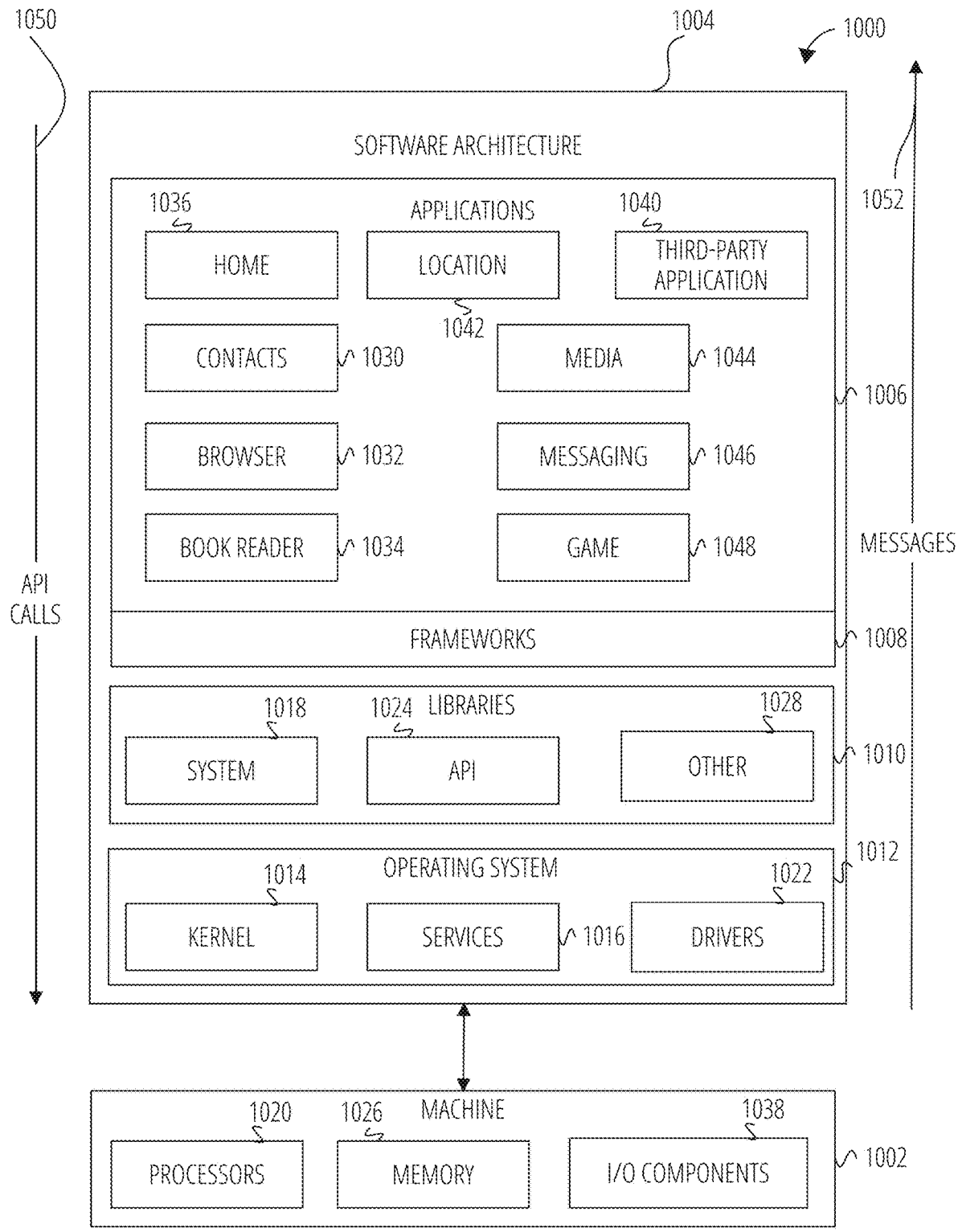
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management (e.g., networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
    determining to establish a live session between a first device associated with a first user and a second device associated with a second user;
    switching, in response to the determining, from a first mode of processing session data received from the first device to a second mode of processing the session data received from the first device, the session data corresponding to session events,
    wherein the first mode provides for accessing a database in association with the session data for non-live replay of the session events, and
    wherein the second mode provides for accessing both the database and a short-latency queue in association with the session data for live replay of the session events, the short-latency queue being configured to provide real-time or near-real-time storage of the session data, and to provide subsequent real-time or near-real-time retrieval of the session data and subsequent real-time or near-real-time transmission of the session data;
    receiving, from the first device, indication of first user input provided by the first user with respect to a first data input field of plural data input fields included in a page displayed on the first device;
    determining whether the first user input corresponds to personally identifiable information;
    causing, in response to determining that the first user input does not correspond to personally identifiable information, the second device to display the plural data input fields and to display the first user input in association with the first data input field; and
    causing, in response to determining that the first user input corresponds to personally identifiable information, the second device to display the plural data input fields and to mask display of the first user input in association with the first data input field.

2. The method of claim 1, wherein causing the second device to display the plural data input fields, to display the first user input in association with the first data input field when the first user input does not correspond to personally identifiable information, and to mask display of the first user input in association with the first data input field when the first user input corresponds to personally identifiable information corresponds to providing the live session between the first user and the second user.

3. The method of claim 2, further comprising:
    receiving, from the first device, indication of a live mode trigger indicating to establish the live session between the first device and the second device,
    wherein the live session is established based on receiving indication of the live mode trigger.

4. The method of claim 3, wherein receiving indication of the live mode trigger is based on the first user initiating a chat session with the second user.

5. The method of claim 3, further comprising:
    receiving, from the second device, indication of user input selecting a link to establish the live session,
    wherein the live session is established based on receiving indication of the live mode trigger and indication of the user input.

6. The method of claim 2, wherein providing the live session comprises:
    receiving session data from the first device;
    updating the short-latency queue with the session data; and
    causing, based on updating the short-latency queue, the second device to display the live session.

7. The method of claim 1, wherein determining that the first user input corresponds to personally identifiable information is based on the first user input matching predefined text classifications indicating personally identifiable information.

8. The method of claim 1, wherein the second mode provides for generating a combined data feed which combines the session data from the database and from the short-latency queue, the combined data feed corresponding to the live replay of the session events.

9. The method of claim 1, further comprising:
    storing, in a database and based on determining that the first user input does not correspond to personally identifiable information, the first user input in association with the first data input field; and
    storing, in a database and based on determining that the first user input corresponds to personally identifiable information, a masked version of the first user input in association with the first data input field.

10. A system comprising:
    a processor; and
    a memory storing instructions that, when executed by the processor, configure the processor to perform operations comprising:
    determining to establish a live session between a first device associated with a first user and a second device associated with a second user;
    switching, in response to the determining, from a first mode of processing session data received from the first device to a second mode of processing the session data received from the first device, the session data corresponding to session events,
    wherein the first mode provides for accessing a database in association with the session data for non-live replay of the session events, and
    wherein the second mode provides for accessing both the database and a short-latency queue in association with the session data for live replay of the session events, the short-latency queue being configured to provide real-time or near-real-time storage of the session data, and to provide subsequent real-time or near-real-time retrieval of the session data and subsequent real-time or near-real-time transmission of the session data;
    receiving, from the first device, indication of first user input provided by the first user with respect to a first data input field of plural data input fields included in a page displayed on the first device;
    determining whether the first user input corresponds to personally identifiable information;
    causing, in response to determining that the first user input does not correspond to personally identifiable information, the second device to display the plural data input fields and to display the first user input in association with the first data input field; and
    causing, in response to determining that the first user input corresponds to personally identifiable information, the second device to display the plural data input fields and to mask display of the first user input in association with the first data input field.

11. The system of claim 10, wherein causing the second device to display the plural data input fields, to display the first user input in association with the first data input field when the first user input does not correspond to personally identifiable information, and to mask display of the first user input in association with the first data input field when the first user input corresponds to personally identifiable information corresponds to providing the live session between the first user and the second user.

12. The system of claim 11, the operations further comprising:
receive, from the first device, indication of a live mode trigger indicating to establish the live session between the first device and the second device,
wherein the live session is established based on receiving indication of the live mode trigger.

13. The system of claim 12, wherein receiving indication of the live mode trigger is based on the first user initiate a chat session with the second user.

14. The system of claim 12, the operations further comprising:
receive, from the second device, indication of user input selecting a link to establish the live session,
wherein the live session is established based on receiving indication of the live mode trigger and indication of the user input.

15. The system of claim 11, wherein providing the live session comprises:
receiving session data from the first device;
updating the short-latency queue with the session data; and
cause, based on updating the short-latency queue, the second device to display the live session.

16. The system of claim 10, wherein determining that the first user input corresponds to personally identifiable information is based on the first user input matching predefined text classifications indicating personally identifiable information.

17. A non-transitory computer-readable storage medium, the computer-readable storage medium including instructions that when executed by a computer, cause the computer to perform operations comprising:
determining to establish a live session between a first device associated with a first user and a second device associated with a second user;
switching, in response to the determining, from a first mode of processing session data received from the first device to a second mode of processing the session data received from the first device, the session data corresponding to session events,
wherein the first mode provides for accessing a database in association with the session data for non-live replay of the session events, and
wherein the second mode provides for accessing both the database and a short-latency queue in association with the session data for live replay of the session events, the short-latency queue being configured to provide real-time or near-real-time storage of the session data, and to provide subsequent real-time or near-real-time retrieval of the session data and subsequent real-time or near-real-time transmission of the session data;
receiving, from the first device, indication of first user input provided by the first user with respect to a first data input field of plural data input fields included in a page displayed on the first device;
determining whether the first user input corresponds to personally identifiable information;
causing, in response to determining that the first user input does not correspond to personally identifiable information, the second device to display the plural data input fields and to display the first user input in association with the first data input field; and
causing, in response to determining that the first user input corresponds to personally identifiable information, the second device to display the plural data input fields and to mask display of the first user input in association with the first data input field.

* * * * *